(12) United States Patent
Lee et al.

(10) Patent No.: US 6,733,908 B1
(45) Date of Patent: May 11, 2004

(54) MULTILAYER ARTICLE HAVING STABILIZED ZIRCONIA OUTER LAYER AND CHEMICAL BARRIER LAYER

(75) Inventors: Kang N. Lee, Westlake, OH (US); Narottam P. Bansal, North Olmsted, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 143 days.

(21) Appl. No.: 10/191,050

(22) Filed: Jul. 8, 2002

(51) Int. Cl.$^7$ ............................ B32B 9/00; B32B 15/04; F03B 3/12
(52) U.S. Cl. .................. 428/702; 428/469; 428/336; 428/446; 428/448; 428/641; 428/699; 428/701; 428/697; 416/241 B
(58) Field of Search ................... 428/469, 632, 428/633, 699, 701, 702, 641, 697, 332, 336, 212, 446, 448; 416/241 B (56) References Cited

U.S. PATENT DOCUMENTS

| 4,095,003 A | 6/1978 | Weatherly et al. |
| 4,183,798 A | 1/1980 | Esper et al. |

(List continued on next page.)

FOREIGN PATENT DOCUMENTS

| EP | 0 304 176 | 7/1988 |
| EP | 0 595 451 B1 | 4/1996 |
| EP | 1 111 085 A1 | 6/2001 |
| EP | 1 142 850 A1 | 10/2001 |
| WO | WO 01/63008 A2 | 8/2001 |

OTHER PUBLICATIONS

*Erosion Studies on Duplex and Graded Ceramic Overlay Coatings*, Saifi Usamani et al., Nov. 1996–JOM, pp. 51–55.

(List continued on next page.)

*Primary Examiner*—John J. Zimmerman
*Assistant Examiner*—Jennifer McNeil
(74) *Attorney, Agent, or Firm*—Kent N. Stone (57) ABSTRACT

A multilayer article includes a substrate that includes at least one of a ceramic compound and a Si-containing metal alloy. An outer layer includes stabilized zirconia. Intermediate layers are located between the outer layer and the substrate and include a mullite-containing layer and a chemical barrier layer. The mullite-containing layer includes 1) mullite or 2) mullite and an alkaline earth metal aluminosilicate. The chemical barrier layer is located between the mullite-containing layer and the outer layer. The chemical barrier layer includes at least one of mullite, hafnia, hafnium silicate and rare earth silicate (e.g., at least one of $RE_2SiO_5$ and $RE_2Si_2O_7$ where RE is Sc or Yb). The multilayer article is characterized by the combination of the chemical barrier layer and by its lack of a layer consisting essentially of barium strontium aluminosilicate between the mullite-containing layer and the chemical barrier layer. Such a barium strontium aluminosilicate layer may undesirably lead to the formation of a low melting glass or unnecessarily increase the layer thickness with concomitant reduced durability of the multilayer article. In particular, the chemical barrier layer may include at least one of hafnia, hafnium silicate and rare earth silicate.

8 Claims, 3 Drawing Sheets

U.S. PATENT DOCUMENTS

| | | | |
|---|---|---|---|
| 4,299,865 | A | 11/1981 | Clingman et al. |
| 4,882,109 | A | 11/1989 | Matsui et al. |
| 5,223,045 | A | 6/1993 | Priceman |
| 5,304,519 | A | 4/1994 | Jackson et al. |
| 5,391,404 | A | 2/1995 | Lee et al. |
| 5,443,686 | A | 8/1995 | Jones et al. |
| 5,466,208 | A | 11/1995 | Jackson et al. |
| 5,484,263 | A | 1/1996 | Nagaraj et al. |
| 5,763,008 | A | 6/1998 | Sarin et al. |
| 5,869,146 | A | 2/1999 | McCluskey et al. |
| 5,871,820 | A | 2/1999 | Hasz et al. |
| 5,894,053 | A | 4/1999 | Fried |
| 5,906,895 | A | 5/1999 | Hamada et al. |
| 5,985,470 | A | 11/1999 | Spitsberg et al. |
| 6,044,830 | A | 4/2000 | Jones |
| 6,071,628 | A | 6/2000 | Seals et al. |
| 6,106,959 | A | 8/2000 | Vance et al. |
| 6,129,954 | A | 10/2000 | Spitsberg et al. |
| 6,159,553 | A | 12/2000 | Li et al. |
| 6,254,935 | B1 | 7/2001 | Eaton et al. |
| 6,258,467 | B1 | 7/2001 | Subranamian |
| 6,296,447 | B1 | 10/2001 | Rigney et al. |
| 6,296,909 | B1 | 10/2001 | Spitsberg et al. |
| 6,299,988 | B1 | 10/2001 | Wang et al. |
| 6,340,500 | B1 | 1/2002 | Spitsberg |

OTHER PUBLICATIONS

*Thermal Barrier Coatings for Heat Engines*, T. Troczynski et al., pp 451–463. 1996 Trans Tech Publications, Switzerland, no month.

High Temperature Corrosion Materials Chemistry, *Effects of Impurities and Coating Design on the Durability of EBC for Silicon–Base Ceramics*, Kang N. Lee, Electrochemical Society Proceedings vol. 99–38, pp. 417–428, date unknown.

*Durability of Mullite/YSZ–Coated SIC in 90% $H_2O/O_2$* Advances in Ceramic Matrix Composites IV, pp. 17–25. Reprinted from Ceramic Transactions, vol. 96 (1999), no month.

*Ceramic Thermal Barriers for Demanding Turbine Applications*, W.A. Kaysser et al., cfi/Ber, DKG 77 (2000) No. 6, pp. 32–36, no month.

*Degradation of Environmental Barrier Coatins (EBC) Due to Chemical and Thermal Expansion Incompatibilty*, High Temperature Corrosion and Material Chemistry III, Lee, Electrochemical Soc Proceedings Vol 2001–12, pp. 124–135, date unknown.

*Modification of Mullite–Based Coatings on Si–Based Ceramics for Enhanced Durability*, Hitemp Review 1997, Advanced High Temperature Engine Materials Technology Program, vol. III:Turbine Materials–CMC's, pp 1–12, no month.

*Key Durability Issues with Mullite–Based Environmental Barrier Coatings for Si–Based Ceramics*, Kang N. Lee, vol. 122, Oct. 2000, pp. 632–636.

*Concept of Functionally Graded Materials for Advanced Thermal Barrier Coating Applications*, Woo Y. Lee et al., J. Am. Ceramics Society 79 (12) 3003–12 (1996), no month.

*Oxidation and Pore Formation at the Mullite/SIC Interface in Air and Water Vapor, Fundamental Aspects of High Temperature Corrosion*, Proceedings vol. 96–26, pp. 124–139, date unknown.

*Architecture of Thermal Barrier Coatings Produced by Electron Beam–Physical Vapor Deposition (EB–PVD)*, Jogender Singh, et al., Proceedings from Processing and Fabrication of Advanced Materials IX, Oct. 9–12, 2000.

*Development and environmental durability of mullite and mullite/YSZ dual layer coatings for Sic and $Si_3N_4$ ceramics.* Kang N. Lee, et al., Surface & Coatings Technology 86–87 (1996) pp. 142–148, no month.

*Contamination Effects on Interfacial Porosity during Cyclic Oxidation of Mullite–Coated Silicon Carbide*, Kang N. Lee, pp. 3329–3332, J. Am Ceram Soc 81 (12) 1998, no month.

*Current status of environmental barrier coatings for SI–Based Ceramics*, K.N. Lee, Surface and Coatings Technology 133–134 (2000) 1–7, no month.

*Corrosion–Resistant CVD Mullite Coatings for $Si_3N_4$*, Haynes et al., Ceramic Engineering and Science Proceedings, Jan. 1999.

*Ceramic Oxide–Coated Silicon Carbide for High Temperature Corrosive Environments*, Price et al. Materials for Advanced Technology Applications, Sep. 1991.

*Formation of mullite coatings on silicon–based ceramics by chemical vapor deposition*, S.N. Basu et al., International Journal of Refractory Metals & Hard Materials 16 (1998) 343–352, no month.

*Environmental Durability of Mullite Coating/SiC and Mullite–YSZ Coating/SiC Systems*, K.N. Lee et al., Ceramic Engineering & Science Proceedings, Sep.–Oct. 1995, pp 1036–1045.

High Temperature Ceramic Matrix Composites, Environmental Barrier Coatings for Silicon Based Ceramics K.N. Lee et al., pp 225–229, date unknown.

*Thermal Conductivity of Ceramic Coating Materials Determined by a Laser Heat Flux Technique*, High Temperature Ceramic Matrix Composites, Zhu et al., pp 263–267, date unknown.

*EBC Protection of SiC/SiC composites in the Gas Turbine Combustion Environment*,, Eaton et al., date unknown, pp 1–5.

*X–ray Diffraction Data for Yttrium Silicates*, K. Liddell et al., pp 17–22, date unknown.

*Paralinear Oxidation of CVD SiC in Water Vapor*, J. AM Ceramic Society, 80 (1) 197–205 (1997), no month.

*Thermal Conductivity and Thermal Gradent Cyclic Behavior of Refractory Silicate Coatings on SIC/SIC Ceramic Matrix Composites*Zhu et al., Conf. on Advanced Ceramics and Structures, Jan. 21–26, 2001, pp 1–10.

*Phase Evolution of BSAS in Environmental Barrier Coatings*, Eldridge et al., Cocoa Beach 2001, no month.

*Protective Capacity of CVD Mullited Coatings in a High–Temperature, High–Pressure, Air–$H_2O$ Environment*, Haynes et al., Journal of American Ceramic Society, Aug. 5, 1999, pp 1–14.

*New Generation of Plasma–Sprayed Mullite Coatings on Silicon Carbide*, K.N. Lee et al., J. Am Ceramic Society 78 (3) 705–10 (1995), no month.

*High Temperature Coating Study to Reduce Contact Stress Damage of Ceramics*, Richerson et al., date unknown, pp 453–461.

*SiC and $Si_3N_4$recession due to $SiO_2$Scale volatility under combustor conditions*, Smialek et al., Adv. Composite Mater, vol. 8, No. 1, pp 33–45 (1999), no month.

*$Y_2SiO_5$As Oxidation Resistant Coating For C/C Composites*, Y. Ogura, 10th International Conference on Composites, Whistler, BC Canada, date unknown.

MULTILAYER ARTICLE HAVING STABILIZED ZIRCONIA OUTER LAYER AND CHEMICAL BARRIER LAYER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. §2457).

FIELD OF THE INVENTION

The present invention is directed to a multilayer system for protecting components exposed to severe environmental and thermal conditions such as the hostile environment present in gas turbine engines.

BACKGROUND OF THE INVENTION

A major limitation in the efficiency and emission of current gas turbines is the temperature capability (strength and durability) of metallic structural components (blades, nozzles and combustor liners) in the engine hot section. Although ceramic thermal barrier coatings are used to insulate metallic components, thereby allowing the use of higher gas temperatures, the metallic component remains a weak link. Such components must allow for the possibility of coating loss from spallation or erosion.

Silicon-containing ceramics are ideal materials for high temperature structural applications such as heat exchangers, advanced gas turbine engines, and advanced internal combustion engines. They have excellent oxidation resistance in clean oxidizing environments due to the formation of a slow-growing silica scale ($SiO_2$). However, durability in high temperature environments containing molten salts, water vapor or a reducing atmosphere can limit their effectiveness. Molten salts react with silica scale to form liquid silicates. Oxygen readily diffuses through liquid silicates and rapidly oxidizes the substrate. High water vapor levels lead to hydrated silica species ($Si(OH)_x$) and subsequent evaporation of protective scale. Complex combustion atmospheres containing oxidizing and reducing gases form $SiO_2$ and reduce it to $SiO_{(g)}$. In situations with low partial pressure of oxidant, direct formation of $SiO_{(g)}$ occurs. All of these reactions can potentially limit the formation of a protective silica scale and thus lead to accelerated or catastrophic degradation.

Examples of silicon-containing ceramics are SiC fiber-reinforced SiC ceramic matrix composites (SiC/SiC CMC's), SiC fiber-reinforced $Si_3N_4$ matrix composites (SiC/$Si_3N_4$ CMCs), carbon reinforced SiC ceramic matrix composites (C/SiC CMCs), monolithic silicon carbide and monolithic silicon nitride. A primary problem Si-containing ceramics face is rapid recession in combustion environments due to the volatilization of silica scale via reaction with water vapor, a major product of combustion. Therefore, use of silicon-containing ceramic components in the hot section of advanced gas turbine engines requires development of a reliable method to protect the ceramic from environmental attack. One approach in overcoming these potential environmental limitations is to apply a barrier coating which is environmentally stable in molten salts, water vapor and/or reducing atmosphere.

An early environmental barrier coating system (EBC) consisted of two layers, a mullite ($3Al_2O_3.2SiO_2$) coat and a yttria-stabilized zirconia (YSZ) top coat. The mullite coat provided bonding, while the YSZ coat provided protection from water vapor. Mullite has a good coefficient of thermal expansion match and chemical compatibility with Si-based ceramics. However, the relatively high silica activity of mullite and the resulting selective volatilization of silica cause its rapid recession in water vapor. This EBC provided protection from water vapor for a few hundred hours at 1300° C. During longer exposures, however, water vapor penetrated through cracks in the mullite and attacked the Si-containing substrate, leading to coating delamination.

Another EBC with improved performance was developed as part of a NASA High Speed Research-Enabling Propulsion Materials (HSR-EPM) Program in joint research by NASA, GE, and Pratt and Whitney. The EBC consisted of three layers: a silicon bond coat, an intermediate coat consisting of mullite or mullite and barium strontium aluminosilicate (BSAS), and a BSAS top coat. The mullite, mullite and BSAS, and BSAS layers were applied by a modified plasma spray process developed at the NASA Glenn Research Center as disclosed in U.S. Pat. No. 5,391,404, which is incorporated by reference herein in its entirety. The EBC was applied to SiC/SiC CMC combustor liners used in three Solar Turbine Centaur 50s gas turbine engines. The combined operation of the three engines resulted in the accumulation of tens of thousands of hours without failure at a maximum combustor lining temperature of about 1250° C. A drawback of this BSAS-top coat EBC is that when applied to the solar turbine SiC/SiC liners it suffered from substantial BSAS recession after engine testing.

FIG. 1 of EP 1142850 shows an EBC which employs a YSZ topcoat 18, a YSZ-containing intermediate layer 24 between the topcoat and a Si-containing substrate 12, and a BSAS layer 22 between the YSZ-containing intermediate layer 24 and the substrate. The inventor of the present application has found that when BSAS and YSZ react, an undesirable low melting glass results. This problem was not recognized in the EP '850 disclosure as is apparent by the close proximity of BSAS layer 22 and YSZ layer 24. EP '850 discloses that intermediate YSZ-containing layer 24 can includes sublayers in which an inner sublayer in contact with the BSAS layer 22 contains one of BSAS, mullite or alumina and an outer sublayer in contact with the YSZ top coat consists essentially of YSZ. This again is disadvantageous in that it can position the outer YSZ sublayer in contact with an inner sublayer containing BSAS.

EP '850 also discloses compositionally grading layer 24 using YSZ and one of BSAS, mullite or alumina. The EBC of EP '850 will have BSAS-mullite contact when the mullite/YSZ graded layer is used. The inventor has found that mullite-BSAS reaction can become a serious durability issue in long-term exposures (over several hundred hours) as the reaction has the potential to produce a reaction product with a melting point as low as 1300° C. Thus, the inventor has found that it is desirable to avoid the mullite-BSAS contact especially at outer layers where the temperature is higher. Another disadvantage is that the BSAS layer 22 adds 125 to 500 µm of thickness to the EBC. A thick EBC has increased interlayer stress which may result in delamination. Therefore, the BSAS layer 22 at best presents a risk of delamination and at worst is deleterious to the EBC upon reaction of BSAS and YSZ or reaction of BSAS and mullite.

Current EBCs fail by delamination and spallation along a "weak link". The stress caused by the YSZ layer accelerates the failure. A key source for the creation of this "weak link" is environmental/chemical degradation. Key material properties for long life EBCs should include environmental/chemical stability, low CTE, low modulus, sinter resistance, low thermal conductivity, and phase stability. Multilayer systems containing a YSZ outer layer and a mullite or mullite and alkaline earth metal aluminosilicate-containing intermediate layer, are potentially effective EBC systems, but there is a need to improve their performance by prolonging life or increasing the capacity to withstand higher operating temperatures.

SUMMARY OF THE INVENTION

The present invention is directed to a multilayer article which includes a substrate comprising a compound selected from the group consisting of a ceramic compound, a Si-containing metal alloy and combinations thereof. The multilayer article also includes an outer layer and a plurality of intermediate layers located between the outer layer and the substrate. The outer layer comprises fully or partially stabilized zirconia ($ZrO_2$), preferably yttria stabilized zirconia, although rare earth elements besides yttria may be used as stabilizers. Intermediate layers are located between the outer layer and the substrate, one of which comprises a mullite ($3Al_2O_3.2SiO_2$)-containing layer comprising 1) mullite or 2) mullite and an alkaline earth metal aluminosilicate. The mullite (no BSAS) intermediate layer is desirable when the multilayer article is used at temperatures of 1300° C. and above for extended periods of time. One intermediate layer is an (outer) chemical barrier layer located between the mullite-containing layer and the outer layer. Yet another intermediate layer is an optional (inner) chemical barrier layer located between the mullite-containing layer and a bond layer or, if no bond layer is used, between the mullite-containing layer and the substrate.

The outer chemical barrier layer comprises a compound selected from the group consisting of mullite, hafnia ($HfO_2$), hafnium silicate (e.g., $HfSiO_4$), rare earth silicate (e.g., at least one of $RE_2SiO_5$ and $RE_2Si_2O_7$ where RE is Sc or Yb), and combinations thereof, and, in particular, is hafnia, hafnium silicate or rare earth silicate. The outer chemical barrier layer is preferably located between an intermediate layer and the outer layer, more particularly, in contact with the outer layer and even more particularly is contiguous with both the outer layer and the mullite-containing layer.

The outer chemical barrier layer may be compositionally graded and consists essentially of a compound selected from the group consisting of mullite, hafnia ($HfO_2$), hafnium silicate (e.g., $HfSiO_4$), rare earth silicate (e.g., at least one of $RE_2SiO_5$ and $RE_2Si_2O_7$ where RE is Sc or Yb), and combinations thereof in contact with the mullite-containing layer and consists essentially of stabilized zirconia in contact with the outer layer. The chemical barrier layer has a decreasing concentration of at least one of the mullite, hafnia ($HfO_2$), hafnium silicate (e.g., $HfSiO_4$) and rare earth silicate (e.g., at least one of $RE_2SiO_5$ and $RE_2Si_2O_7$ where RE is Sc or Yb), and an increasing concentration of the stabilized zirconia, in a direction toward the outer layer.

The combination of the inventive outer chemical barrier layer composition and lack of a layer consisting essentially of BSAS between the mullite-containing layer and the outer chemical barrier layer, provides the multilayer article with very good performance. The outer chemical barrier layer advantageously inhibits or prevents the reaction between the outer layer and the mullite-containing layer. For example, when the outer layer includes YSZ and the mullite-containing layer includes BSAS, the chemical barrier layer prevents the formation of low melting glass resulting from YSZ and BSAS reaction. This chemical barrier effect is especially beneficial when the multilayer article is subjected to high temperatures (i.e., temperatures at 1300° C. and above), where the interdiffusion between adjacent layers increases. In addition, by not employing a BSAS layer between the mullite containing layer and the outer chemical barrier layer, the thickness of the multilayer article can be substantially reduced. The thicker the EBC, the more likely that stresses will develop leading to delamination. In particular, a thickness of a portion of the multilayer article between an inner surface of the outer chemical barrier layer and an outer surface of the substrate ranges from 25 to 250 µm and, more specifically, may be less than 200 µm.

The inner mullite chemical barrier layer may be used between the mullite and glass ceramic intermediate layer and the silicon bond layer (or between the mullite and glass ceramic intermediate layer and the substrate when no bond layer is used) to prevent detrimental glass ceramic (e.g. BSAS, CAS, MAS)-silica reaction.

The inventive multilayer system includes two types of optional bond layers. The bond layer (e.g., bond coat) may be located between the mullite-containing layer and the substrate, preferably in contact with the substrate. A silicon-containing bond layer is preferred when the temperature at the bond layer is below the melting point of silicon. Alternatively, a bond layer which comprises a silicon-containing metal alloy having a melting point above the melting point of silicon may be used, such as Mo—Si alloy and Nb—Si alloy. Suitable bond layer compositions would be apparent to those skilled in the art in view of this disclosure.

Turning to more specific features of the multilayer article of the invention, the alkaline earth metal aluminosilicate is preferably a compound selected from the group consisting of barium strontium aluminosilicate or BSAS ($xBaO.(1-x)SrO.Al_2O_3.SiO_2$) where $0 \leq x \leq 1$, calcium aluminosilicate or CAS ($CaO.Al_2O_3.2SiO_2$), magnesium aluminosilicate, also referred to as MAS or cordierite ($2MgO.2Al_2O_3.5SiO_2$), and combinations thereof. An especially suitable mullite-containing layer comprises mullite and BSAS.

Although the outer layer may be referred to as a top coat, it need not be a coating per se. Also, other layers may be placed on top of the outer layer (i.e., further from the substrate than the outer layer). It should be understood that terms such as "upper, lower, top, bottom" and the like are used in this disclosure for purposes of illustration and should not be used to limit the invention, since these relative terms depend upon the orientation of the substrate. The intermediate layers are typically layers that are applied to the substrate or to a layer(s) on the article. However, some substrate materials, such as mullite matrix-containing materials, inherently form an intermediate layer (e.g., mullite). Whether applied or inherent, both constitute intermediate layers as these terms are used in this disclosure. The intermediate layers are defined herein as being located between the outer layer and a bond (e.g., Si-containing) layer on the substrate or, if no bond layer is used, between the outer layer and the substrate.

The substrate may be a ceramic compound, a Si-containing metal alloy, or both. The ceramic of the substrate may be a Si-containing ceramic or oxide ceramic with or without Si. The substrate comprises one of the following compounds: a Si-containing ceramic, such as silicon carbide (SiC), silicon nitride ($Si_3N_4$), composites having a SiC or $Si_3N_4$ matrix, silicon oxynitride, and silicon aluminum oxynitride; a Si-containing metal alloy, such as molybdenum-silicon alloys (e.g., $MoSi_2$) and niobium-silicon alloys (e.g., $NbSi_2$); and an oxide ceramic such as mullite-containing ceramics (e.g., a mullite matrix with ceramic fibers, such as alumina fibers, dispersed in the matrix). The substrate may comprise a matrix reinforced with ceramic fibers, whiskers, platelets, and chopped or continuous fibers.

Other features, details and advantages of the invention will be apparent from the attached drawings and detailed description that follows.

DETAILED DESCRIPTION

The present invention is directed to a multilayer article which is particularly well suited to resist a harsh high temperature, water vapor environment. The inventive articles are suited as hot section structural components of gas turbine and internal combustion engines and heat exchanger tubes for industrial furnaces. If uncoated, the substrates would suffer from rapid recession in heat engine-type environments due to the volatilization of silica by water vapor. The inventive multilayer article resists degradation in various environments, but particularly in high temperature, water vapor-containing combustion environments, by being tailored to possess water vapor resistance, coefficient of thermal expansion match with the substrate, phase stability and chemical compatibility among the layers and substrate.

Figure 1:
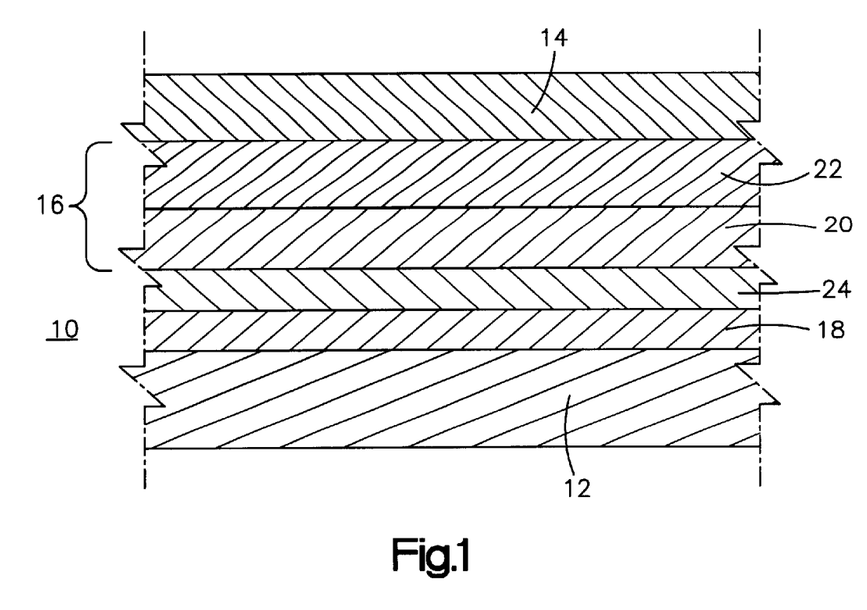
FIG. 1 is a cross-sectional view of a multilayer article made in accordance with the present invention, including optional layers, it being understood that the geometry of the article may vary from what is shown according to the shape of the component it comprises such as components of heat exchangers, gas turbine engines and internal combustion engines. The relative thicknesses of the layers are not drawn to scale and may vary from what is shown in the figure.

Referring to FIG. 1, the inventive multilayer article 10 comprises a substrate 12 comprising a ceramic or a silicon-containing metal alloy. An outer layer 14 overlies the substrate and intermediate layers 16 are located between the outer layer and the substrate. An optional bond layer 18 is disposed between the intermediate layers 16 and the substrate 12. The intermediate layers 16 comprise a mullite-containing layer 20 and an outer chemical barrier layer 22 disposed between the mullite-containing layer 20 and the outer layer 14.

The outer layer 14 comprises fully or partially stabilized zirconia. The zirconia may be stabilized with a selected rare earth element and in an amount that would be apparent to one skilled in the art in view of this disclosure. A suitable stabilized zirconia is yttria stabilized zirconia (YSZ).

Although each layer of the inventive coating system may have various functions, a principal function of the multilayer system is to protect substrates which are susceptible to recession resulting from volatilization upon exposure to water vapor. This is especially true of Si-containing materials, which are preferred substrate materials of the inventive articles. The inventive system provides an environmental barrier which inhibits formation of gaseous species of Si, particularly $Si(OH)_x$, when the substrate is exposed to a high temperature environment containing water vapor.

A purpose of the outer layer is to provide thermal protection by generating a temperature gradient due to its low thermal conductivity. Although the multiple layers used in the present invention may be referred to as environmental barrier coatings (EBC), the term EBC should not be used to limit the function or applicability of the multilayer article of the present invention. Each of the layers on the substrate may have a chemical resistant, temperature resistant and/or other function.

The optional bond layer 18 and intermediate layers 16 improve bonding of the outer layer 14 to the substrate. The multilayer system can include a single bond layer (e.g., bond coat) adjacent the substrate or multiple layers (intermediate layers with or without a bond coat). The inventive multilayer system includes two types of optional bond layers. The bond layer may be located between the mullite-containing layer and the substrate, preferably in contact with the substrate. A silicon-containing bond layer is preferred when the temperature at the bond layer is below the melting point of silicon.

Alternatively, a bond layer which comprises a silicon-containing metal alloy having a melting point above the melting point of silicon may be used, such as Mo—Si alloy and Nb—Si alloy. Suitable bond layer compositions would be apparent to those skilled in the art in view of this disclosure.

The mullite-containing layer 20 comprises (1) mullite or (2) mullite and alkaline earth metal aluminosilicate. The alkaline earth metal aluminosilicate is preferably BSAS ($(1-x)$BaO.$(x)$SrO.$Al_2O_3$.$2SiO_2$, where $0 \leq x \leq 1$), CAS ($CaO.Al_2O_3.2SiO_2$) or MAS or cordierite ($2MgO.2Al_2O_3.5SiO_2$). The mullite-containing layer is preferably comprised of the combination of mullite and BSAS because it has suitable crack resistance. Under certain conditions, this may result in better durability compared to EBC's having a mullite intermediate layer. The mullite and glass ceramic tend to form low melting glasses at relatively high temperatures (above about 1300° C.). Mullite alone can be used as an intermediate layer to eliminate glass formation, especially in higher temperature applications.

Reference to the "chemical barrier" layer should not be used to limit the present invention as it is intended to characterize a predominant feature of this layer, not to exclude other features of the layer such as thermal resistance or water penetration resistance. YSZ can react with the mullite and glass ceramic (e.g., BSAS, CAS or MAS) intermediate layer 20 especially at high temperatures (i.e., at or above 1300° C.), forming low melting reaction products. A low melting reaction product should be avoided since it not only reduces the life of the article but also increases thermal conductivity of the layers. Therefore, the outer chemical barrier layer 22 is applied between the mullite and glass ceramic intermediate layer 20 and the outer layer 14.

The outer chemical barrier layer 22 comprises at least one of mullite, hafnia ($HfO_2$), hafnium silicate (e.g., $HfSiO_4$) and rare earth silicate (e.g., at least one of $RE_2SiO_5$ and $RE_2Si_2O_7$ where RE is Sc or Yb). Any of the rare earth silicates disclosed in the U.S. Patent application entitled "Multilayer Article Characterized by Low Coefficient of Thermal Expansion Outer Layer," filed on May 22, 2002, which is incorporated herein by reference in its entirety, may be suitable outer chemical barrier layer materials in the inventive multilayer article disclosed herein. The outer chemical barrier layer is preferably located between and contiguous with the outer layer 14 and the mullite-containing layer 20.

Any combinations (mechanical or chemical mixtures or compositional grading) of the outer chemical barrier layer 22 may be used. By compositional grading is meant a multi-layer which includes the combination of two or more materials in successive layers using increasing amounts of one component and decreasing amounts of another to match the coefficient of thermal expansion between materials, such as between the top coat and substrate or between an intermediate layer and outer layer. When the outer chemical barrier layer 22 is compositionally graded it has a decreasing concentration of at least one of the mullite, hafnia ($HfO_2$), hafnium silicate (e.g., $HfSiO_4$), and rare earth silicate (e.g., the at least one of $RE_2SiO_5$ and $RE_2Si_2O_7$ where RE is Sc or Yb), and an increasing concentration of the stabilized zirconia, in a direction toward the outer layer. The outer chemical barrier layer 22 consists essentially of a compound selected from the group consisting of mullite, hafnia ($HfO_2$), hafnium silicate (e.g., $HfSiO_4$), rare earth silicate (e.g., the at least one of $RE_2SiO_5$ and $RE_2Si_2O_7$ where RE is Sc or Yb), and combinations thereof in contact with the mullite-containing layer 20 and consists essentially of stabilized zirconia in contact with the outer layer 14.

Another option is to apply a mullite inner chemical barrier layer 24 between the mullite-and-glass ceramic intermediate layer 20 and the silicon bond layer 18 (or between the mullite-and-glass ceramic intermediate layer 20 and the silicon-containing substrate 12 when no bond layer is used) to prevent detrimental glass ceramic-silica reaction. Use of the mullite layer 24 is particularly desirable when the intermediate layer 20 contains BSAS or other glass ceramic.

The ceramic of the substrate may be a Si-containing ceramic or oxide ceramic with or without Si. The substrate comprises a Si-containing ceramic, such as silicon carbide (SiC), silicon nitride ($Si_3N_4$), composites having a SiC or $Si_3N_4$ matrix, silicon oxynitride, and silicon aluminum oxynitride. Examples of silicon-containing ceramics are SiC fiber-reinforced SiC ceramic matrix composites (SiC/SiC CMC's), SiC fiber-reinforced $Si_3N_4$ matrix composites (SiC/$Si_3N_4$ CMCs) and carbon reinforced SiC ceramic matrix composites (C/SiC CMCs). The substrate may also comprise a Si-containing metal alloy, such as molybdenum-silicon alloys (e.g., $MoSi_2$) and niobium-silicon alloys (e.g., $NbSi_2$). Another suitable substrate comprises an oxide ceramic such as mullite-containing ceramics (e.g., a mullite matrix with ceramic fibers, such as alumina fibers, dispersed in the matrix). The substrate may comprise a matrix reinforced with ceramic fibers, whiskers, platelets, and chopped or continuous fibers.

The material of each of the layers of the multilayer article is applied to the substrate by the plasma spraying process generally described in the U.S. Pat. No. 5,391,404 patent, which is incorporated herein by reference in its entirety. Other ways of applying the layer material to the substrate and to other layers would be apparent to those skilled in the art in view of this disclosure.

The thickness of the bond layer 18 ranges from 5 to 125 μm, in particular from 25 to 75 μm. The thickness of the mullite-containing layer 20 ranges from 25–400 μm, in particular from 125 to 250 μm. The thickness of the outer chemical barrier layer 22 ranges from 25–400 μm, in particular from 125 to 250 μm. The thickness of the optional mullite inner chemical barrier layer 24 ranges from 5 to 125 μm, in particular from 25 to 75 μm. The thickness of the YSZ outer layer 14 ranges from 25 to 400 μm, in particular from 125 to 250 μm.

Experimental Procedure

The following experimental procedure was used to prepare and evaluate the performance of the samples discussed in the following examples. The EBC's were applied by plasma spraying onto sintered, monolithic SiC (Hexoloy™, Carborundum) and melt infiltrated (MI) SiC/SiC composites (GE Power Systems Composites) by atmospheric pressure plasma spraying as generally described in the U.S. Pat. No. 5,391,404 patent.

The specific plasma spray conditions are shown in the following Table I.

TABLE I

| Powder particle size | −62/+20 μm |
|---|---|
| Gun power | 40 kw |
| Plasma Gas | 14.4 SLPM* Ar, 9.6 SLPM He |
| Carrier Gas | 2–6 SLPM Ar |
| Powder feed rate | 15 gm/min |
| Standoff | 15 cm |
| Traverse speed | 30 cm/sec |

*Standard liters per minute

Only one face of the test coupons (2.5 cm×0.6 cm×0.15 cm) was coated. Silicon powder was purchased from Atlantic Equipment Engineers, mullite powder from Cerac, Inc., BSAS powder from H. C. Starck Inc. and Praxair Specialty Ceramics, YSZ from Praxair Specialty Ceramics, and mullite+YSZ mixtures from Cambridge Microtech. Mullite+BSAS mixture is a simple mechanical mixture of mullite and BSAS powders. The substrates were sintered, monolithic SiC (Hexaloy™, Carborundum) and melt infiltrated (Ml) SiC/SiC composites (GE Power Systems Composites).

Table II below lists the test conditions to which all of the comparative and inventive EBC's were subjected. The steam environment was generated by pumping water into a cyclic rig using a peristaltic pump. The cyclic rig consists of a high purity alumina tube (99.8% purity) and a vertical tube cycling furnace. The pumped water was rapidly vaporized by passing through quartz wool at a temperature greater than 300° C. in flowing oxygen. A box furnace was used for the ambient air environment. The use of monolithic SiC and the absence of a Si bond coat in the ambient air exposure were to eliminate the melting of silicon (mp=1416° C.) in the 1500° C. exposure. Tests in the ambient air were to investigate the EBC chemical stability. The progress of degradation was determined by visual observation, cross-sectional examination using scanning electron microscopy (SEM), and chemical analysis using energy dispersive spectroscopy (EDS). Phase transformations in YSZ were determined by X-ray diffraction.

TABLE II

| | Test conditions | |
|---|---|---|
| Environment | Steam (90% $H_2O$-10% $O_2$) | Ambient air |
| Temperature (° C.) | 1300, 1400 | 1400, 1500 |
| Cycle frequency (hour) | 1 | 20 |
| Gas velocity (cm/sec) | 2.2 | 0 |
| Total pressure (atm) | 1 | 1 |
| Substrate | MI SiC/SiC | sintered SiC |
| Silicon bond coat | Yes | No |

The multilayer articles described in the following examples were prepared and evaluated according to the foregoing experimental procedure. They are provided for the purpose of illustration and are not intended to limit the claimed invention as defined by the appended claims.

COMPARATIVE EXAMPLE 1

Figure 2:
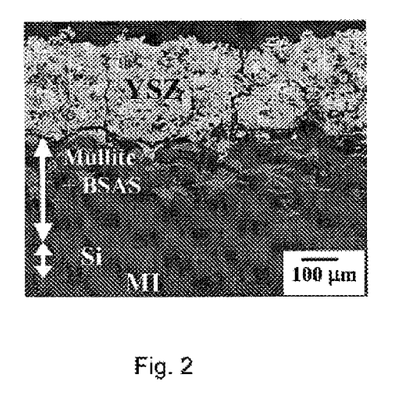
FIG. 2 is an SEM micrograph showing the cross-section of a comparative EBC comprising a Si bond coat, a mullite and BSAS coat and a YSZ top coat on a Ml SiC/SiC substrate after heating for 240 hours at 1400° C. in steam.

The reference numerals discussed in the examples correspond to those shown in FIG. 1. Si/mullite+BSAS/YSZ EBC's formed on a Ml SiC/SiC substrate remained adherent after exposure to 1300° C. in steam for 100 hours. As shown in FIG. 2, after heating for 240 hours at 1400° C. in steam, a partial spallation was observed, typically along the Si/mullite+BSAS interface or through the Si bond coat. Significant cracking was also observed, typically through the thickness of the YSZ and along the mullite+BSAS/YSZ interface.

A significant BSAS-silica reaction was observed at the Si/mullite+BSAS interface, especially on delaminated or spalled areas. This indicates that oxidation of silicon and the subsequent BSAS-silica reaction contributed to the delamination and spalling of the EBC. It is believed that the combination of EBC stresses and the environmental/chemical degradation at the Si/mullite+BSAS interface is mainly responsible for the EBC spallation. The bright phase in the mullite+BSAS intermediate coat in FIG. 2 is BSAS, elongated in the y direction due to the splat formation during the deposition, and the dark phase is mullite. The morphology of the EBC did not change much from the as-processed EBC, except for the Si/mullite+BSAS interface, which became fuzzy due to the BSAS-silica reaction. In some areas, pores in the YSZ top coat were filled with the reaction product, which appears to have been molten at 1400° C., due to a reaction at the mullite+BSAS/YSZ interface.

Figure 3:
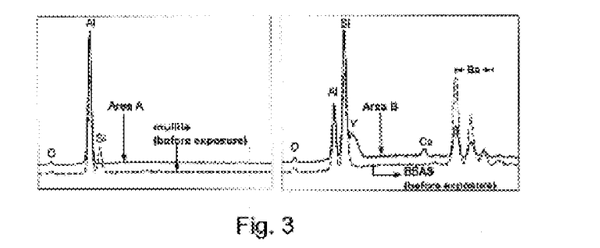
FIG. 3 is an EDS spectrum of a comparative EBC comprising a Si bond coat, a mullite and BSAS coat and a YSZ top coat on a Ml SiC/SiC substrate after heating for 20 hours at 1500° C. in air.
Figure 4:
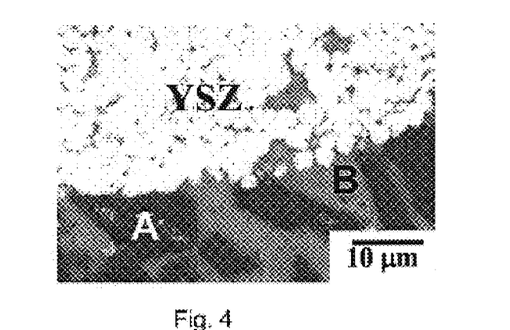
FIG. 4 is an SEM micrograph showing the cross-section of the EBC from which the EDS spectrum of FIG. 3 was taken.

The (mullite+BSAS)-YSZ reaction became more pronounced at 1500° C. FIG. 4 shows the mullite+BSAS/YSZ interface after heating for 20 hours at 1500° C. in air. The changes in the morphology of the intermediate coat compared to the EBC in FIG. 2 are that the bright phase became smaller in size and more closely spaced. Pores in the YSZ are completely filled with a reaction product. EDS analysis (FIG. 3) detected only aluminum from the dark phase (area A in FIG. 4), and aluminum, silicon, barium (strontium peak overlaps with the silicon peak), yttrium, and calcium from the bright phase (area B in FIG. 4). It appears that silica from the mullite and yttria from the YSZ reacted with BSAS, forming the molten reaction product. The calcium is believed to come from impurities in powders or from insulation refractory materials of the box furnace.

Regarding the undesirable YSZ/BSAS reaction, according to the $Y_2O_3$—$Al_2O_3$—$SiO_2$ phase diagram (Phase Equilibria Diagrams, CD-ROM Database Version 2.1, The American Ceramic Society, Westerville, OH (1998)), the ternary system is capable of forming compounds with a melting point as low as ~1400° C. even without BaO, SrO, and CaO. The presence of these alkali earth metal oxides will further reduce the melting point of reaction products in the ternary system. While not wanting to be bound by theory, a molten reaction product is undesirable in that it is believed to increase EBC thermal conductivity because it tends to fill open spaces in the EBC. The thermal conductivity of the BSAS-coated Ml SiC/SiC substrate continuously increased during thermal exposure, which was attributed to the formation of a low melting reaction product by the BSAS-silica reaction. The reaction product moved to the YSZ surface forming a molten surface layer. The mullite+BSAS/YSZ interface is avoided in the present invention to prevent the formation of the low melting reaction product.

COMPARATIVE EXAMPLE 2

The Si/mullite/BSAS/YSZ EBC was completely spalled along the BSAS/YSZ interface after heating for 100 hours at 1300° C. and 1400° C. in steam. This suggests a weak BSAS-YSZ adherence. After heating at 1400° C. for 120 hours in air, the EBC was partially delaminated along the BSAS/YSZ interface. Significant reactions were observed at the BSAS/YSZ and the mullite/BSAS interfaces.

Figure 5:
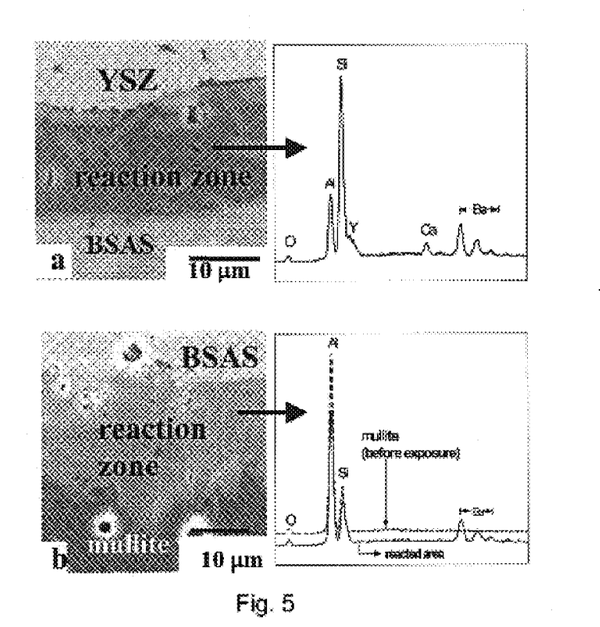
FIG. 5a is an SEM micrograph and EDS spectrum of the cross-section of the BSAS/YSZ interface and FIG. 5b is an SEM micrograph and EDS spectrum of the mullite/BSAS interface after heating for 120 hours at 1400° C. in air.

FIG. 5 shows the BSAS/YSZ and the mullite/BSAS interfaces after heating for 120 hours at 1400° C. in air. The EDS spectrum from the BSAS/YSZ reaction zone (FIG. 5a) is similar to that of the reaction product at the mullite+BSAS/YSZ interface. Similar to the Si/mullite+BSAS/YSZ EBC (FIGS. 2 and 4), pores in the YSZ were filled with the reaction product, indicating that the reaction product was molten at 1400° C. The EDS spectrum from the mullite/BSAS reaction zone (FIG. 5b) contains aluminum, silicon, and barium. The intensity of these peaks is between that of mullite and BSAS peaks, suggesting that the reaction zone is the result of interdiffusion between the two layers. There were no indications that the reaction zone was molten at 1400° C. after the 100 hour exposure. The mullite-BSAS reaction appears to be benign to EBC durability for the short-term exposure conducted in this study. However, the mullite-BSAS reaction can become a serious durability issue in long-term exposures (over several hundred hours) as the reaction has the potential to produce a reaction product with a melting point as low as 1300° C. according to the $SiO_2$—$Al_2O_3$—$BaO$ phase diagram (Phase Equilibria Diagrams, CD-ROM Database Version 2.1, The American Ceramic Society, Westerville, Ohio (1998)). Thus, it is desirable to avoid the mullite-BSAS contact especially at outer layers where the temperature is higher.

EXAMPLE 3

The mullite/YSZ interface maintains good chemical stability at temperatures up to 1500° C., suggesting that mullite can be an effective chemical barrier between the mullite+BSAS layer 20 and the YSZ top coat 14. One way to alleviate the CTE mismatch stress between the YSZ outer layer 14 and mullite+BSAS layer 20 is by creating a compositionally graded chemical barrier layer 22, starting with mullite at the bottom then gradually increasing the YSZ/mullite ratio towards the YSZ top coat. A graded layer of mullite/mullite+25v/o YSZ/mullite+50v/o YSZ/mullite+75v/o YSZ, was applied between the mullite+BSAS layer 20 and the YSZ top coat 14.

Figure 6:
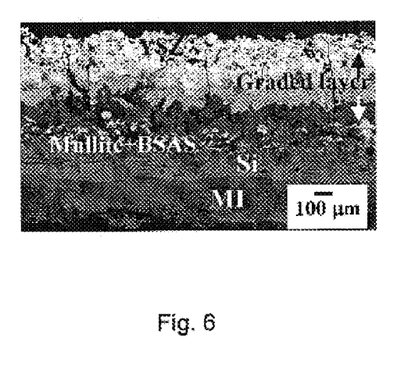
FIG. 6 is an SEM micrograph showing a cross-section of an inventive multilayer article comprising a Si bond layer, a mullite and BSAS intermediate layer, no BSAS layer, a graded mullite and YSZ chemical barrier layer and a YSZ outer layer on a Ml SiC/SiC substrate after heating for 370 hours at 1400° C. in steam.

FIG. 6 shows the cross-section of the EBC comprising a Si bond coat 18, a mullite+BSAS layer 20, no BSAS layer, a graded mullite+YSZ chemical barrier layer 22 and a YSZ top coat 14 (~750 μm thick) on a M1 SiC/SiC substrate 12 after heating for 370 hours at 1400° C. in steam. The EBC showed a partial spallation (i.e., entire coating coming off in some areas) after the exposure, an improvement compared to the EBC comprising a Si bond coat, a mullite+BSAS layer and a YSZ top coat, in which a partial spallation was observed after heating for 240 hours at 1400° C. in steam.

The failure mode of this EBC was more complex than the other EBCs. Although the spallation occurred typically along the Si/mullite+BSAS interface or through the Si bond coat, some areas spalled through the mullite+BSAS or the mullite layers. Significant cracking was also observed, typically through the thickness of the graded mullite+YSZ/YSZ and along or near the mullite+BSAS/mullite interface as shown in FIG. 6. There were no indications of low melting reaction products within the EBC, except for the BSAS-silica reaction product at the Si/mullite+BSAS interface and mullite-BSAS interdiffusion within the mullite+BSAS layer. The better durability of this EBC (Si/mullite+BSAS/no BSAS/graded mullite+YSZ/YSZ) compared to the other EBCs mentioned is attributed to the improved chemical stability and the diffused CTE mismatch stress due to the compositionally graded mullite+YSZ layer. It is believed that the combined use of the graded mullite/YSZ chemical barrier layer 22 and omission of a BSAS layer lead to improved performance of this EBC (i.e., less risk of delamination and improved chemical stability which will lead to longer life and enhanced reliability) compared to the EBC disclosed in FIG. 1 of EP '850 comprising Si bond layer 16, mullite and BSAS layer 20, BSAS layer 22, graded mullite and YSZ layer 24 and YSZ top coat 18. The present invention avoids the BSAS-mullite reaction which has the potential to form a reaction product at temperatures at 1300° C. and above.

EXAMPLE 4

In view of the deleterious reaction between YSZ and aluminosilicates, BSAS in particular, a chemical compatibility test was carried out to confirm the chemical barrier layer materials would inhibit or prevent the YSZ/BSAS reaction. Powders of mullite, hafnia ($HfO_2$), hafnium silicate (e.g., $HfSiO_4$), and rare earth silicate (e.g., at least one of $RE_2SiO_5$ and $RE_2Si_2O_7$ where RE is Sc or Yb) were mixed with mullite+20 wt% BSAS powders and heated for 24 hrs in air. No combinations produced molten products at temperatures up to 1500° C. There was significant diffusion between mullite and BSAS, which can lead to reduced EBC life by altering the chemistry of the layer or even by producing a low melting product in long term exposures (over thousands of hours). Therefore, it is desirable to avoid mullite-BSAS contact in areas of the coating where the temperature is 1300° C. or higher for an extended period of time by eliminating BSAS from the mullite-containing layer. According to phase diagrams (Phase Equilibria Diagrams, CD-ROM Database Version 2.1, The American Ceramic Society, Westerville, Ohio (1998)) $HfO_2$ and $ZrO_2$ do not form low melting products. Rare earth oxides are routinely used to stabilized $HfO_2$ and $ZrO_2$ without forming detrimental reaction products. It was shown (Example 3) that mullite and YSZ do not react at temperatures up to 1500° C. Therefore, it is expected that none of these materials would form a liquid phase with YSZ.

Although the present invention has been described with reference to the examples and with some degree of particularity in the detailed description, it should be understood that various modifications and variations can be made by those skilled in the art without departing from the spirit and scope of the invention as set forth hereafter in the appended claims.

What is claimed is:

1. A multilayer article comprising:

a substrate comprising a compound selected from the group consisting of a ceramic compound, a Si-containing metal alloy and combinations thereof;

an outer layer comprising stabilized zirconia; and intermediate layers located between said outer layer and said substrate comprising
- a mullite-containing layer comprising 1) mullite or 2) mullite and an alkaline earth metal aluminosilicate, and
- a chemical barrier layer located between said mullite-containing layer and said outer layer, wherein said chemical barrier layer comprises a compound selected from the group consisting of mullite, hafnia, hafnium silicate, rare earth silicate, and combinations thereof, with the proviso that said multilayer article does not have a layer consisting essentially of barium strontium aluminosilicate between said mullite-containing layer and said chemical barrier layer, and wherein said chemical barrier layer is contiguous with said mullite-containing layer.

2. A multilayer article comprising:

a substrate comprising a compound selected from the group consisting of a ceramic compound, a Si-containing metal alloy and combinations thereof;

an outer layer comprising stabilized zirconia; and intermediate layers located between said outer layer and said substrate comprising
- a mullite-containing layer comprising 1) mullite or 2) mullite and an alkaline earth metal aluminosilicate,
- a chemical barrier layer located between said mullite-containing layer and said outer layer, wherein said chemical barrier layer comprises a compound selected from the group consisting of mullite, hafnia, hafnium silicate, rare earth silicate, and combinations thereof, with the proviso that said multilayer article does not have a layer consisting essentially of barium strontium aluminosilicate between said mullite-containing layer and said chemical barrier layer, and
- a mullite chemical barrier layer disposed between said mullite-containing layer and said substrate.

3. A multilayer article comprising:

a substrate comprising a compound selected from the group consisting of a ceramic compound, a Si-containing metal alloy and combinations thereof;

an outer layer comprising stabilized zirconia, and intermediate layers located between said outer layer and said substrate comprising
- a mullite-containing layer comprising 1) mullite or 2) mullite and an alkaline earth metal aluminosilicate, and
- a chemical barrier layer located between said mullite-containing layer and said outer layer, wherein said chemical barrier layer comprises a compound selected from the group consisting of hafnia, hafnium silicate, rare earth silicate, and combinations thereof.

4. The multilayer article of claim 3 wherein said rare earth silicate is at least one of $RE_2SiO_5$ and $RE_2Si_2O_7$ where RE is Sc or Yb.

5. The multilayer article of claim 3 wherein a thickness of a portion of said multilayer article between an inner surface of said chemical barrier layer and an outer surface of said substrate is less than 200 $\mu$m.

6. The multilayer article of claim 5 further comprising a silicon-containing layer comprising at least one of Si and a Si-containing alloy located between said mullite-containing layer and said substrate.

7. The multilayer article of claim 3 further comprising a mullite chemical barrier layer disposed between said mullite-containing layer and said substrate.

8. A component of one of a gas turbine engine, an internal combustion engine and a heat exchanger, comprised of the multilayer article of claim 3.

* * * * *